United States Patent [19]

Miller

[11] 4,094,958

[45] June 13, 1978

[54] PROCESS FOR THE SEPARATION OF $NH_3$ FROM A GASEOUS MIXTURE CONTAINING $NH_3$ AND HCN

[75] Inventor: Ralph Miller, Pleasantville, N.Y.

[73] Assignee: Ciba-Geigy Corporation, Ardsley, N.Y.

[21] Appl. No.: 784,771

[22] Filed: Apr. 5, 1977

[51] Int. Cl.² .............................................. C01C 3/00
[52] U.S. Cl. ..................................... 423/238; 423/395
[58] Field of Search ..................... 423/238, 396, 236; 55/68, 70

[56] References Cited

U.S. PATENT DOCUMENTS

| | | | |
|---|---|---|---|
| Re. 21,217 | 9/1939 | Fauser | 423/396 |
| 1,700,914 | 2/1929 | Toniolo | 423/396 |
| 2,797,148 | 6/1957 | Carlson | 423/238 |
| 3,112,177 | 11/1963 | Fujise et al. | 423/236 |
| 3,870,782 | 3/1975 | Cook et al. | 423/396 |

FOREIGN PATENT DOCUMENTS 265,576  10/1964  Australia .............................. 423/238

*Primary Examiner*—O. R. Vertiz
*Assistant Examiner*—Eugene T. Wheelock
*Attorney, Agent, or Firm*—Wenderoth, Lind & Ponack

[57] ABSTRACT

A process for the separation of ammonia from a gaseous mixture containing ammonia and hydrogen cyanide which comprises contacting said gaseous mixture in an absorption stage with an absorbent liquor comprising an acidified ammonium nitrate solution thereby selectively absorbing ammonia from said gaseous mixture and forming a solution of diminished acidity, adding nitric acid to the ammonium nitrate-containing solution of diminished acidity to restore its acidity to its initial level and recycling said restored solution to said absorption stage.

8 Claims, 3 Drawing Figures

LABORATORY NH₄NO₃-HNO₃ SCRUBBING SYSTEM HCN GENERATION FROM NaCN

PROCESS FOR THE SEPARATION OF NH₃ FROM A GASEOUS MIXTURE CONTAINING NH₃ AND HCN

BACKGROUND OF THE INVENTION

1. Field of the Invention

This invention relates to the effective and economical separation of ammonia from gaseous mixture containing ammonia and hydrogen cyanide such as is produced in the Andrussow process for hydrogen cyanide.

2. The Prior Art

The Andrussow hydrogen cyanide process, as described in the *Kirk-Othmer Encyclopedia of Chemical Technology*, Volume 6, pages 577 to 579 (1965), involves passing a mixture of methane or natural gas, ammonia and air over a platinum catalyst at 1000° to 1200° C to produce an effluent containing hydrogen cyanide, water and unreacted ammonia.

Most Andrussow-process HCN plants employ sulfuric acid to scrub the ammonia out of the HCN-containing gas leaving the reactor. The ammonia reacts with the sulfuric acid to form a reasonably concentrated ammonium sulfate solution. The solution can be processed to recover solid ammonium sulfate for sale as fertilizer.

In some instances this practice is being continued even though the selling price of the ammonium sulfate is less than its production cost. In other instances, the ammonium sulfate is thermally decomposed and the $SO_2$ converted back to sulfuric acid because of the low value of the ammonium sulfate.

Other Andrussow plants employ removal of the ammonia with a solution of ammonium hydrogen phosphate such as described in Carlson, U.S. Pat. No. 2,797,148 and Carlson et al., U.S. Pat. No. 3,718,731, both incorporated by reference herein.

The ammonium hydrogen phosphate system has several drawbacks. For example:

1. The solution containing a mixture of monoammonium and diammonium phosphate, even when conditions are optimal, is a relatively poor absorbent for $NH_3$ so that there must be a large number of transfer stages in the absorber. This means a tall absorber is required equipped with an appreciable number of trays. Not only does this requirement necessitate a substantial capital investment, it also means energy has to be continuously supplied to overcome the pressure drop experienced by the gas as it passes upward counter-current to the absorbent liquor in the absorption tower. In addition, the absorbent leaves a small amount of ammonia in the gas.

2. The trace of ammonia left in the gas must be removed in a second scrubber. Sulfuric acid is fed to the second scrubber. The resulting solution of sulfuric acid and ammonium sulfate is bled from the process. Prior to being discarded, the bleed ammonium sulfate solution is treated to destroy its ammonia content because current effluent regulations prohibit the discharge of more than modest amounts of Kjeldahl nitrogen.

3. Because the "phosphate" solution is a relatively poor absorbent for ammonia and its absorbent power diminishes with increase in temperature, the contacting of the absorbent liquor and ammonia-containing gas has to be carried out at a relatively low temperature. Because the solution leaving the ammonia absorber is relatively low in temperature with a pH close to 8, some HCN also dissolves in the absorbent. This HCN must be separated and recovered from the solution prior to its regeneration, further increasing the required capital investment and the cost of ammonia recovery.

4. The ammonia-rich phosphate solution which has an $NH_4^+/PO_4^\equiv$ ratio close to 1.8 is regenerated by protracted fractional distillation until the $NH_4^+/PO_4^\equiv$ ratio is reduced to about 1.3. Approximately 25 pounds of steam are expended for each pound of recovered ammonia. To minimize the amount of steam needed, a tall, well-designed stripper has to be used, further increasing the required capital investment. To maintain the phosphate solution at the correct concentration nearly all the water vaporized is condensed and returned as reflux. This requires a proportionately large condenser and the circulation of a relatively large volume of cooling water.

5. The vapor leaving the steam stripper is condensed to form an aqueous ammonia solution. This solution must be fractionally distilled, preferably under pressure, to recover a very concentrated ammonia fraction suitable for recycling to the reactor in which the HCN is formed.

Obviously, the ammonium phosphate process, with all of its drawbacks, in some circumstances is preferably to expending money on an acid such as sulfuric acid and then receiving little or no return from the ammonium compound that is formed.

It is equally obvious that an improved process over previous proposals would be a scheme by which the $NH_3$ would be efficiently separated from the HCN with a minimum of capital investment and total operating cost, including such items as the cost of circulating absorbent solution, the cost of supplying energy to cause the HCN-containing gas to flow through the ammonia absorption equipment, the cost of cooling water, the cost of removing HCN from the ammonium salt-containing absorption liquor, and the like.

Of overriding importance is the use of an absorption process that minimizes the formation of HCN polymers termed azulmic acid. Such polymers tend to form when HCN is allowed to stay in contact with aqueous solutions at elevated temperatures in the absence of acidic conditions.

In spite of the use of various precautions, all HCN production plants are bothered by the slow build-up of solid HCN polymers. Because of this, purge streams are bled from circulating solutions in different parts of the process. In addition, at intervals, preferably during shut-downs for maintenance, the equipment must be freed from pockets of solid HCN polymer. Should HCN polymers form to an excess degree, not only will the plant be shut down for polymer removal more frequently than is tolerable, but the yield of HCN will fall. Consequently, any process for ammonia separation must be such that the formation of HCN polymers is kept within tolerable limits.

SUMMARY OF THE INVENTION

The present invention is concerned with the economical recovery of HCN from a gas stream in which it is mixed with ammonia and more particularly is concerned with the economical separation of ammonia from HCN when both these substances are present, in a gaseous mixture containing relatiely small percentages of HCN and ammonia. Typical gas mixtures contain from 5% to 10% HCN and from 1% to 4% ammonia.

It is an object of this invention to make it possible to scrub ammonia out of a gas mixture containing HCN and ammonia using equipment relatively low in cost compared with the cost of the equipment needed by processes hitherto practiced or disclosed.

Another object of this invention is to accomplish the separation of the ammonia from the HCN from a gas mixture in which they are contained by a liquid absorbent having a high affinity for ammonia compared with that for HCN.

An additional object of this invention is to selectively absorb ammonia from a gas mixture containing ammonia and HCN using a liquid absorbent operable at a temperature close to or at the boiling point of water.

A further object of this invention is to selectively absorb ammonia from a gas mixture containing ammonia and HCN employing a liquid absorbent that is operable using a minimum of cooling water and other utilities.

A specific object of this invention is to selectively absorb ammonia from a gas mixture containing ammonia and HCN employing an absorbent which reacts with the ammonia to form a product whose value is such that neither the value of the ammonia nor that of the absorbent is materially downgraded.

The above objectives and others which will be apparent from the following description are realized by scrubbing a gas mixture containing HCN and ammonia with a concentrated solution of ammonium nitrate in which a small concentration of free nitric acid is maintained.

DETAILED DESCRIPTION OF THE INVENTION

Figure 1:
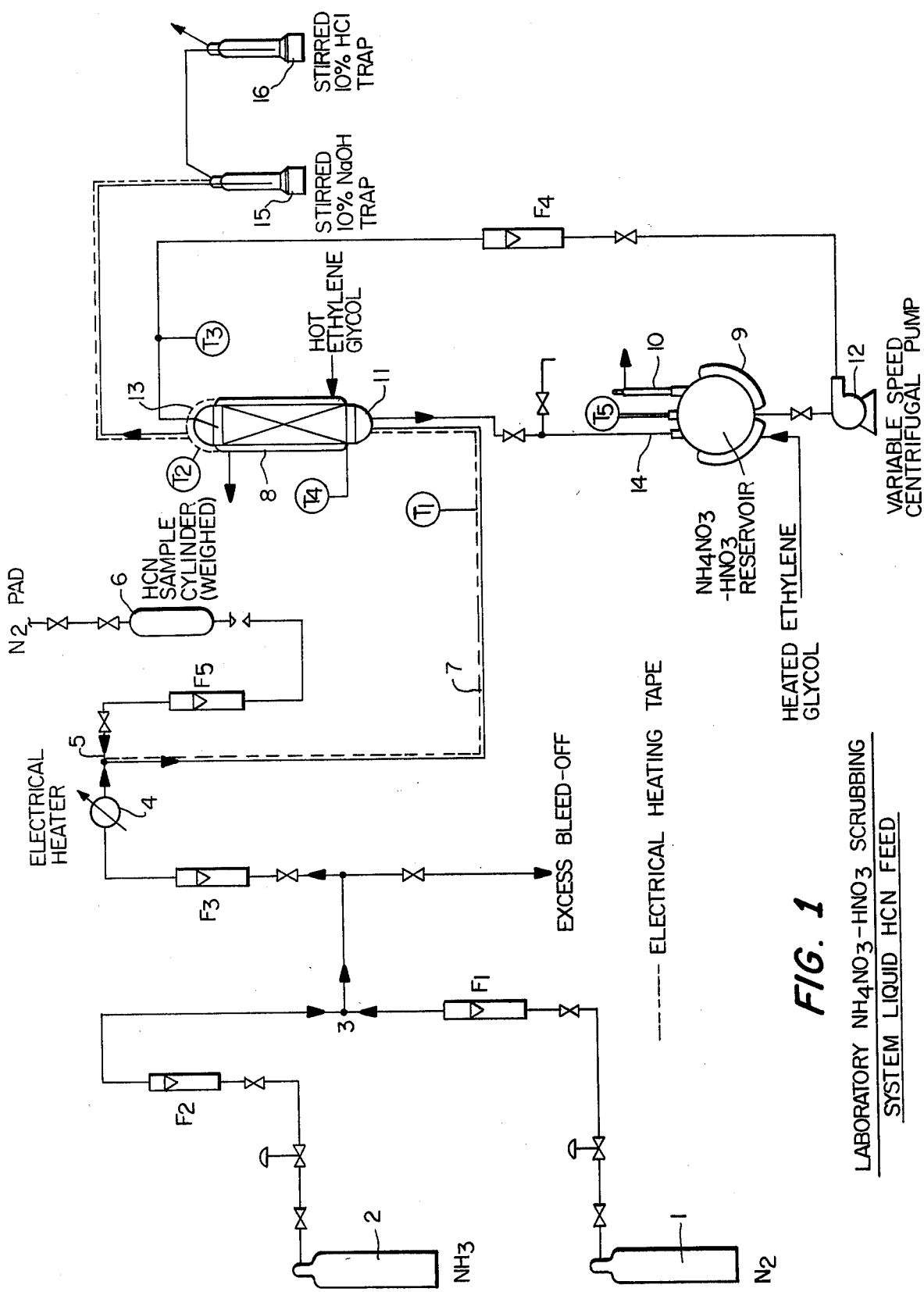
FIG. 1 is a schematic flowsheet of an $NH_4NO_3$—$HNO_3$ scrubbing system using a liquid HCN feed.

The discovery that a nitric acid-use of $NH_4NO_3$ solution can effectively separate ammonia from HCN was entirely unexpected.

It is well known that aqueous nitric acid solutions will absorb gaseous ammonia to form ammonium nitrate. After all, nearly 15 billion pounds of amonium nitrate were made in 1974. In spite of the long-standing problem of improving the economics of the separation of ammonia from HCN when both are present in a gaseous mixture, the application of this well known chemical operation to this specific problem has not been disclosed previously.

It is surmised that there has been no previous recognition of the many advantages which would thereby be realized. There is another possible reason. HCN is a costly material compared with ammonia and sulfuric acid. Consequently, serious consideration would not be given to any process that might cause more than a slight reduction in yield. The possibility exists for the absorbent used in this invention to destroy HCN. This possibility would inhibit any further consideration of the use of nitric acid to separate ammonia from HCN.

The acids which have been used for scrubbing ammonia out of a gas stream in which it was mixed with HCN, to date, have not been volatile. Nitric acid by contrast is a volatile acid and this factor as well may have deterred its use. However, such volatility is beneficial in the instant case, because as long as any is present in the solution, some will be present in the vapor phase. Its concentration in the vapor phase increases as its concentration in the liquid phase increases. An increase in temperature of the liquid phase also increases its vapor phase concentration. If both the ammonia and nitric acid are in the vapor phase, they can and do react without the need for the last trace of ammonia having to pass through a gas-liquid interface prior to its conversion to an ammonium salt. Because of this property of nitric acid, the last trace of ammonia can be removed from the gas using less elaborate equipment than is needed when all of the ammonia must pass through a gas-liquid interface prior to its conversion to a non-volatile ammonium salt.

The fact that nitric acid is volatile makes it possible to insure that the HCN is maintained in an acidic environment under all conditions during its recovery from the gas mixture formed in the synthesis step and this minimizes the possibility of azulmic acid formation.

Unlike the other ammonium salts which have been proposed for use in the separation of HCN and $NH_3$, ammonium nitrate has a strong affinity for ammonia. This affinity, which is well known, is maintained even in the presence of water. Because of this characteristic of ammonium nitrate, its aqueous solutions absorb ammonia more readily at elevated temperatures than ammonium sulfate or diammonium phosphate solutions. This is another advantage of the use of nitric acid to separate ammonia from HCN compared with the use of materials which have been previously proposed for carrying out this separation.

From the foregoing, it will be appreciated that the actual practice of this invention involves the simplified scrubbing of the gas mixture containing ammonia and HCN with an absorbent liquid which is an aqueous, concentrated solution of ammonium nitrate containing at all times sufficient free nitric acid to prevent azulmic acid formation, i.e. at least about 0.2%.

The small concentration of free nitric acid is maintained by the continuous or periodic addition of nitric acid to the circulating absorbent liquor.

The volume of absorbent liquor preferably containing 40% to 65% of dissolved ammonium nitrate, is kept within desirable limits by bleeding an appropriate volume of liquor from the circulating stream.

The physical and chemical properties of the liquid absorbent is probably the most important variable in determining the total cost of scrubbing out the last trace of ammonia from a gas stream in which it is contained. If the ammonia is to be converted to a non-volatile ammonium salt by having it react with an acid, then the ammonia and acid must be brought close enough to each other to enable them to react. Such contact may conveniently be effected in tray columns of conventional design. The use of packed columns is also technically feasible as will be shown below. However, packed columns are usually not favored in large industrial installations if adequate contacting can be achieved by means of tray columns. The reason for this preference is that generally the use of tray columns requires a smaller capital investment and, more important, the pressure drop through tray columns in most instances is smaller than the pressure drop through packed columns. In addition, tray columns do not have the liquid redistribution problem encountered with most packed columns.

HCN is not only toxic but it is insidious since many find it hard to detect. To minimize its hazard, a small laboratory set-up was assembled as shown in FIGS. 1 and 2.

Figure 2:
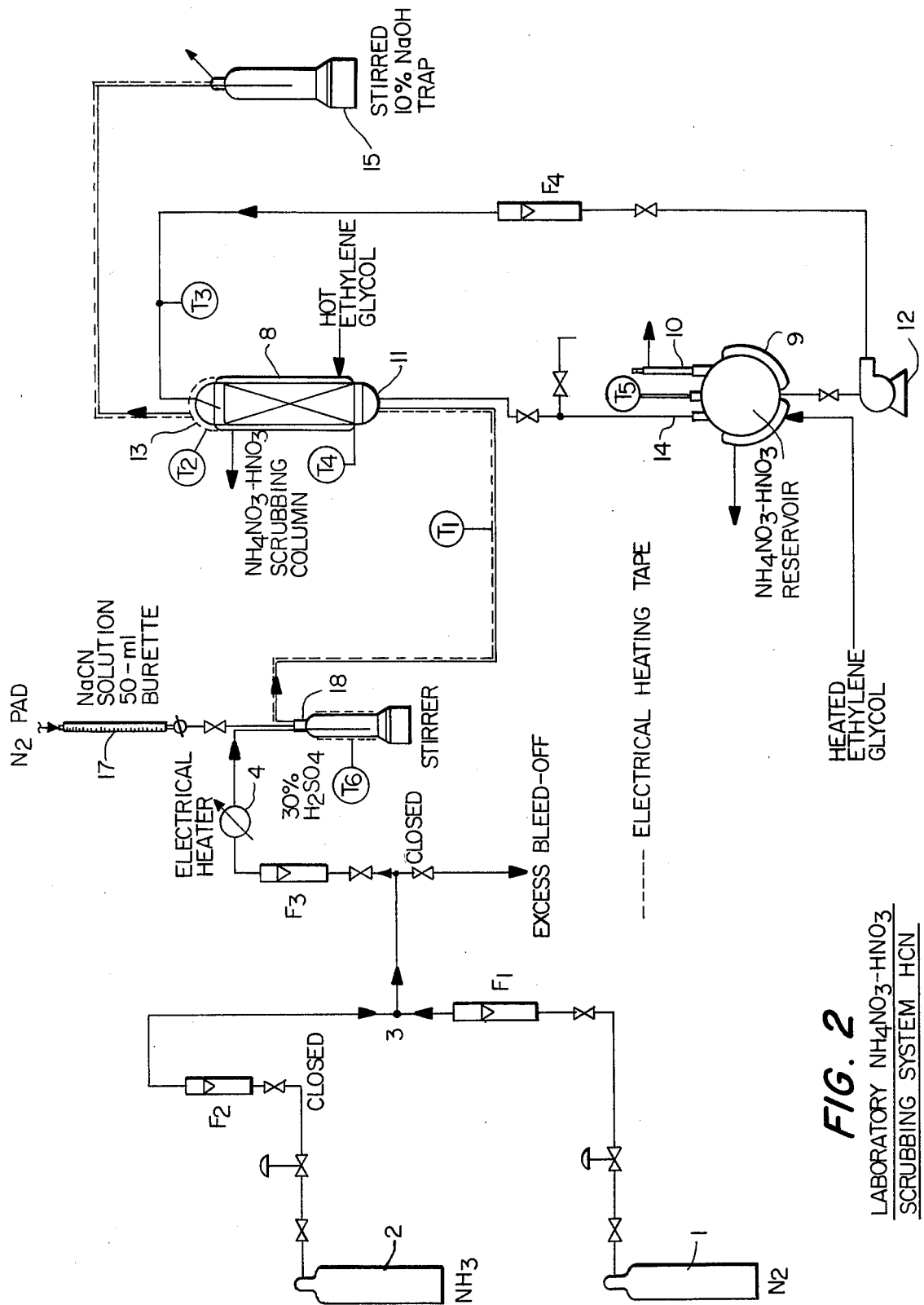
FIG. 2 is a schematic flowsheet of an $NH_4NO_3$—$HNO_3$ scrubbing system wherein the HCN is generated from NaCN.

Referring to FIG. 1, small laboratory size cylinders of nitrogen 1 and ammonia 2 were connected respectively to rotameters $F_1$ and $F_2$. The two gas streams were joined at Tee 3. By using the readings from the rotameters and making appropriate valve adjustments, the desired ratio of ammonia to nitrogen was obtained.

The resulting gas stream was too large in volume to be used in the equipment in which the HCN-containing gas stream was processed. To obtain the desired volume of nitrogen and ammonia, the combined stream of $N_2$ and $NH_3$ was split. The desired volume was allowed to pass through rotameter $F_3$. The excess was vented to a small scrubber not shown. The gas leaving rotameter $F_3$ was then passed through an electrically heated heat exchanger 4. The tubing containing the heated mixture of ammonia and nitrogen is jointed to a Tee 5. A second part of the Tee is jointed to tubing by which HCN is introduced into the system. The third part of the Tee is joined to tubing through which the mixture of $N_2$, HCN and $NH_3$ enters the inlet to the scrubber.

HCN was fed to the system from a small, (75 ml.) stainless steel cylinder 6 that was pressurized with nitrogen. The HCN flow was controlled by means of a fine adjustment needle metering valve. The flow of HCN was observed by means of a small, compact rotameter, $F_5$. Appropriate valve adjustments were used to try to keep the HCN flow constant during each experiment. The amount of HCN fed during each experiment was obtained by weighing the cylinder before and after each test run.

The tubing running from the Tee to the scrubber inlet was wrapped with electrical heating tape 7 to prevent the temperature of the gas falling below 110° C. This is necessary to prevent the formation of solid $NH_4CN$ and its subsequent decomposition.

The scrubber 8 was a jacketed, 1 inch ID column 36 inches of which were packed with ¼ inch ceramic saddles. The saddles were topped with 5 inches of ¼ inch D × ⅜ glass rings and ½ inch of 3/32 inch glass helixes. The upper packing was used to insure an even distribution of scrubbing liquid to the top of th column.

Hot ethylene glycol was passed through the jacket to insure that the liquid passing downward through the column did not cool off.

A working quantity of approximately 60% ammonium nitrate solution in which there was about 2% free nitric acid was maintained in a 2-liter, jacketed flask 9 equipped with a condenser 10 and thermometer. The bottom outlet of the flask was connected to a variable speed centrifugal pump 12. The outlet from the pump was connected to a rotameter, $F_4$. Liquid passing through the rotameter was piped to the liquid inlet 13 at the top of scrubber 8. After passing downward through the packing counter-current to the up-flowing gas, the liquid flowed out of the column's bottom outlet 11 into the top inlet 14 of 2-liter flask 9.

The gas flowing out of the column's gas outlet was piped in turn to two traps in series. The first 15 contained 10% sodium hydroxide and the second 16 10% HCl.

Representative data were obtained by operating the equipment in accordance with the feed and circulation rates shown in the tables below. After a series of preliminary test runs were carried out to gain operating experience, a number of test runs were made just to observe the absorption of ammonia from a gaseous mixture of nitrogen and ammonia. The absorption liquid consisted of a 60% ammonium nitrate solution containing about 2% of free nitric acid. The conditions and data obtained in a typical test run are shown in Table I.

TABLE I
Absorption of $NH_3$ from an $NH_3$—$H_2$ Mixture

| Operating Conditions | |
|---|---|
| $F_1$ - $N_2$ feed rate l/min | 5 |
| $F_2$ - $NH_3$ feed rate g/min | .11 |
| $F_3$ - $N_2+NH_3$ feed ml/min | 500 |
| $F_4$ - Liquid Feed rate ml/min | 175 |
| $T_1$ - Inlet Gas Temp. ° C | 25 |
| $T_2$ - Outlet Gas Temp. ° C | 40 |
| $T_3$ - Inlet Liquid Temp. ° C | 69 |
| $T_4$ - Bottoms Liquid Temp. ° C | 79 |
| $T_5$ - Reservoir Temp. ° C | 81 |
| Material Balance Data | |
| Run Duration - Minutes | 30.5 |
| $NH_3$ feed rate g/min (average) | .0108 |
| Total $NH_3$ feed - grams | .33 |
| $N_2$ feed rate - ml/minute | 485 |
| Total $N_2$ feed - grams | 18.08 |
| Wt. % of $NH_3$ in feed | 1.79 |
| $NH_3$ in HCl Trap - ppm | 25.6 |
| $NH_3$ in HCl Trap - grams | .00955 |
| %$NH_3$ absorbed by $NH_4NO_3$ solution | 97.1 |

These data show the characteristics of the test set-up. A series of runs were then carried out in which a mixture of $N_2$, $NH_3$ and HCN were passed through the column. It was found that the $NH_3$ was readily removed. More than 90% of the $NH_3$ could always be accounted for. This shows the presence of HCN did not diminish the ability of the nitric acid-containing ammonium nitrate solution to absorb $NH_3$. The data illustrating a typical run are shown in Table II.

TABLE II
Absorption of $NH_3$ from an $NH_3$—HCN—$N_2$ Mixture

| Operating Conditions | |
|---|---|
| $F_1$ - $N_2$ feed rate - l/min | 5.0 |
| $F_2$ - $NH_3$ feed rate - g/min | .12 |
| $F_3$ - $N_2+NH_3$ feed to column - ml/min | 550. |
| $F_4$ - Liquid feed rate - ml/min | 190 |
| $F_5$ - Liquid HCN feed rate - ml/min - | erratic |
| $T_1$ - Inlet gas temp. ° C | 89 |
| $T_2$ - Outlet gas temp. ° C | 46 |
| $T_3$ - Inlet liquid temp. ° C | 76 |
| $T_4$ - Outlet liquid temp. ° C | 86 |
| $T_5$ - Reservoir temp. ° C | 90 |
| Material Balance Data | |
| Run Duration - minutes | 53.2 |
| HCN feed rate - g/min average | .124 |
| Total HCN fed - grams | 6.60 |
| $NH_3$ feed rate - g/min average | .0128 |
| Total $NH_3$ fed - grams | .681 |
| $N_2$ feed rate - ml/min | 533 |
| Total $N_2$ fed - grams | 34.65 |
| Wt. % HCN in feed | 15.8 |
| Wt. % $NH_3$ in feed | 1.62 |
| $NH_3$ in NaOH ppm | 99.2 |
| $NH_3$ in NaOH - grams | .0368 |
| $NH_3$ in HCl trap ppm | 25.4 |
| $NH_3$ in HCl trap - grams | .0082 |
| % $NH_3$ - Absorbed | 93.4 |
| HCN in column vent trap % | .3 |
| HCN in column vent trap g | 1.11 |
| HCN $NH_4NO_3$—$HNO_3$ solution % | .27 |
| HCN in $NH_4NO_3$—$HNO_3$ solution - grams | 3.10 |
| Total wt. HCN accounted for - grams | 4.20 |
| % of HCN accounted for | 63.5 |

In the initial experiments the accountability for the HCN was poor. This indicated HCN was being lost as a result of a chemical reaction or the system employed permitted HCN losses to take place as a result of gas leakage. To try to decide the source of HCN losses, a 60% $NH_4NO_3$—2% $HNO_3$ solution containing 0.077% HCN was held at room temperature for 32 hours. On analysis the solution contained 0.074% HCN. Less than 4% of the HCN had disappeared during this period assuming the reported analyses are absolutely correct. The solution was kept for an additional 6 days. It was then heated to 90° C and kept there for one hour. On analysis the HCN content was found to be 0.067%. The solution stayed water white showing that no HCN polymerization had taken place. These data show that if HCN is lost due to a chemical reaction, the reaction is too slow to be of economic significance.

Since the stability of HCN in the system had been established, the test set-up was revised to better establish the weight of HCN charged to a test run. The revision consisted of substituting for the liquid HCN an arrangement by which a known quantity of a sodium cyanide solution 17 was charged to a solution of hot 30% sulfuric acid 18 and feeding the evolved HCN to the system. The revised set-up is shown in FIG. 2.

A preliminary trial run was carried out omitting the contacting with the absorption liquid. Within experimental limits all of the HCN could be accounted for. It was all in the NaOH-containing trap.

Several tests were then carried out in which the HCN generated from NaCN was mixed with nitrogen and the gas passed into the absorption column counter-current to a hot solution of 60% $NH_4NO_3$ containing 1.9% of free nitric acid. From 96.6% to 104.4% of the HCN could be accounted for. This shows that insignificant quantities, if any, of HCN were destroyed by the hot ammonium nitrate solution containing a small amount of free nitric acid.

It was found that when a gas stream containing from 5% to 16% HCN in a gas stream was contacted with a 60% $NH_4NO_3$ solution containing close to 2% free $HNO_3$ at temperatures close to 90° C, the nitrate solution contained about 0.3% dissolved HCN.

Bleeding off a 60% $NH_4NO_3$ solution containing 0.3% HCN would not represent an appreciable loss in yield. If all of this HCN is lost it represents a yield loss of about 0.8%. By heating the 60% $HN_4NO_3$ solution to its boiling point, most of the dissolved HCN is vaporized and can be recovered.

Although not essential in carrying out this invention, it is obviously desirable that the ammonium nitrate solution bled from the $NH_3$ absorption step be heated to its boiling point to vaporize most of the dissolved HCN and some water vapor before the nitrate solution leaves the system. This vapor is recycled to the HCN recovery operation at any convenient location. It is usually convenient to recycle it to the $NH_3$ absorption column.

After the ammonium nitrate solution has been boiled to recover most of the dissolved HCN, it is desirable to add enough free $NH_3$ to the solution to increase its pH above 8 thereby preventing any HCN from vaporizing. After a short period, any small amount of HCN present polymerizes. The amount of polymer percent is so small that its presence is not objectionable — especially as this precludes HCN from vaporizing should the $NH_4NO_3$ solution be acidified subsequently.

In the description above, an acidified 60% ammonium nitrate solution is conveniently employed since this concentration of ammonium nitrate is a typical commercially available concentration in the fertilizer industry. Any reasonably concentrated acidified ammonium nitrate solution within the range of 20 to 75% will perform satisfactorily and 40 to 65% is preferred, as stated above.

The temperature is not particularly critical, however, temperatures of from about 60° C to 100° C are preferred.

Figure 3:
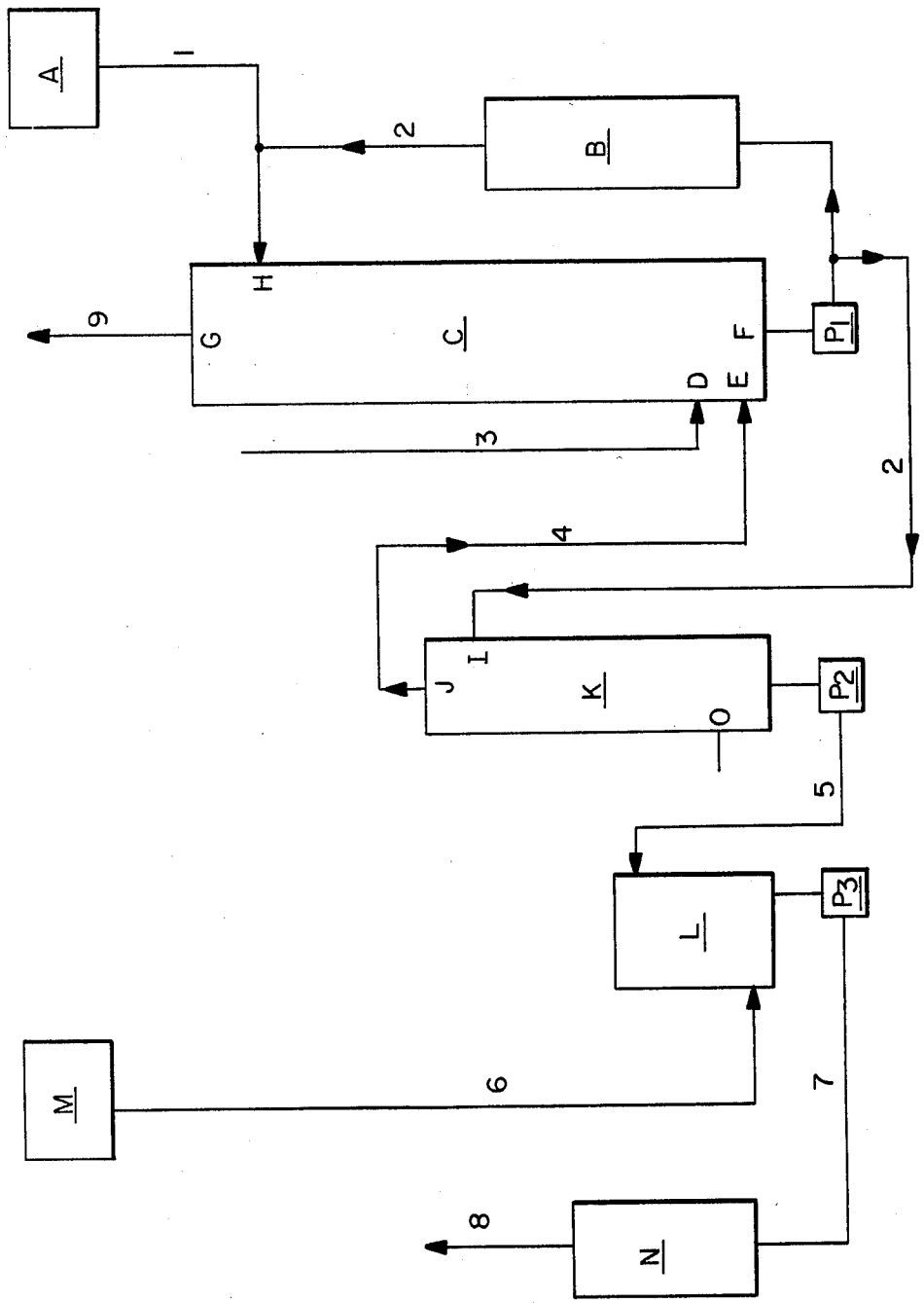
FIG. 3 is a flowsheet for the selective absorption of $NH_3$ from an $NH_3$-HCN containing gas.

FIG. 3 illustrates a simplified arrangement for the practice of this invention. In this Figure, the numbers represent material transfer and letters represent apparatus. The arrangement operates as follows:

A concentrated (60%) solution of ammonium nitrate is charged to a stainless steel gas absorption system consisting of a gas-liquid absorption column C, circulating pump $P_1$ and heat exchanger B. Piping is connected to the system so that controlled quantities of nitric acid 1 can be fed to the system from storage tank A.

The column C has two gas inlets D and E close to its base, a liquid bottom outlet F, a top gas outlet G for release of $NH_3$-free HCN containing gas and a top liquid inlet H. The absorption solution 2 is circulated via pump $P_1$ from the column's bottom outlet F, through the heat exchanger B and into the column C's top inlet H. The solution's temperature is raised to about 95° C and maintained close to that level. Nitric acid 1 is fed continuously to the circulating solution and as soon as the nitric acid concentration in the solution leaving the column exceeds about 1%, a hot gas mixture 3 containing $NH_3$ and HCN is fed to one of the column's bottom inlets D or E. The nitric acid concentration of the solution entering the column is kept close to 2%. The acid concentration of the solution 2 leaving the column at F is never allowed to fall below about 1%.

When the volume of circulating solution 2 exceeds a predetermined level, the excess is bled from the system to the top inlet I of a desorbing column K. This column is equipped with a reboiler not shown. The solution bled from the absorption loop is raised to its boiling point in the reboiler. Ascending steam from inlet O contacts the downward moving liquid stripping it of the small amount of HCN it contained. Vapor 4 consisting of HCN and water leaves the desorption column K by means of its top outlet J and is piped into bottom inlet D of the $NH_3$ absorption column C.

The HCN-stripped acidified ammonium nitrate solution 5 leaving the desorption column is pumped via pump $P_2$ to a neutralizer L. Enough ammonia 6 from ammonia storage tank M is added to the neutralizer L so that all of the free nitric acid in the solution is converted to ammonium nitrate and the solution's pH is raised above 8. The slightly alkaline ammonium nitrate solution 7 leaving the neutralizer L is pumped via pump $P_3$ through a cooler N in which it is cooled below 40° C to 50° C. The cooled, slightly alkaline solution 8 is pumped to storage or to tank cars.

Many modifications of the foregoing details will be apparent without departing from the nature and spirit of the invention.

What is claimed is:

1. A process for the separation of ammonia from a gaseous mixture containing ammonia and hydrogen cyanide which comprises contacting said gaseous mixture in an absorption stage with an absorbent liquor comprising an acidified ammonium nitrate solution thereby selectively absorbing ammonia from said gaseous mixture and forming a solution of diminished acidity, adding nitric acid to the ammonium nitrate-containing solution of diminished acidity to restore its acidity to its initial level and recycling said restored solution to said absorption stage, said nitric acid being present in the liquid and vapor phase of said ammonium nitrate-containing solution in an amount sufficient to inhibit azulmic acid formation.

2. The process according to claim 1 wherein said absorbent liquor contains 40 to 65% by weight of ammonium nitrate dissolved therein.

3. The process according to claim 1 wherein said absorbent liquor contains about 1% to about 5% nitric acid.

4. The process according to claim 2 wherein said contacting is performed at about 60° C to about 100° C.

5. The process according to claim 1 wherein said gaseous mixture contains 0.5 to 5% ammonia and 2% to 16% hydrogen cyanide.

6. The process according to claim 3 wherein said nitric acid concentration is maintained by continuous or periodic addition of nitric acid to said recirculating liquor.

7. The process according to claim 6 wherein the volume of absorbent liquor is controlled by bleeding off a portion of said recirculating liquor periodically or continuously.

8. The process according to claim 1 wherein the said gaseous mixture containing ammonia and hydrogen cyanide is the effluent from the reaction between methane, ammonia and oxygen to produce hydrogen cyanide and water, said effluent also containing unreacted ammonia.

* * * * *